(12) United States Patent
Tanaka et al.

(10) Patent No.: US 6,456,570 B1
(45) Date of Patent: Sep. 24, 2002

(54) MAGNETO-OPTICAL RECORDING APPARATUS AND METHOD USING PHASE DIFFERENT OPTIMIZATION TECHNIQUE

(75) Inventors: Sayoko Tanaka, Gifu; Yoshihisa Suzuki, Bisai, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/570,437

(22) Filed: May 12, 2000

(30) Foreign Application Priority Data

May 14, 1999 (JP) ............................................ 11-134551

(51) Int. Cl.$^7$ .............................................. G11B 11/00
(52) U.S. Cl. ................................................... 369/13.26
(58) Field of Search ........................... 369/13.02, 13.24, 369/13.26, 13.27, 59.1, 59.11, 59.12

(56) References Cited

U.S. PATENT DOCUMENTS

| 4,937,801 | A | * | 6/1990 | Miura et al. | .................. | 369/13 |
| 5,060,208 | A | * | 10/1991 | Nagai et al. | .................. | 369/13 |
| 5,182,734 | A | * | 1/1993 | Watanabe et al. | ............. | 369/13 |
| 5,953,289 | A | * | 9/1999 | Miyaoka | ..................... | 369/13 |

FOREIGN PATENT DOCUMENTS

| EP | 0 321 027 A2 | 6/1989 |
| EP | 0 341 778 A2 | 11/1989 |
| EP | 0 342 624 A2 | 11/1989 |
| EP | 0 417 858 A1 | 3/1991 |
| EP | 0 429 343 A2 | 5/1991 |
| EP | 0 569 054 A2 | 11/1993 |
| EP | 0 578 227 A2 | 1/1994 |
| JP | 11-25535 A | * 1/1999 | .............. 369/13.02 |

OTHER PUBLICATIONS

Goro Fujita, et al., "New Approach to High–Density Recording O A Magneto–Optical Disk", SPIE vol. 1499 Optical Data Storage 1991, pp. 426–432.

* cited by examiner

*Primary Examiner*—Tan Dinh
(74) *Attorney, Agent, or Firm*—Armstrong, Westerman & Hattori, LLP

(57) ABSTRACT

A magnetic domain of a predetermined length is formed on a magneto-optical recording medium with the phase difference altered between the rise of a laser drive signal to generate a pulsed laser beam and the fall of a magnetic head drive signal to generate a magnetic field. A phase difference optimization circuit detects an optimum phase difference corresponding to the lowest error rate from the error rate of a reproduced signal obtained by reproducing the formed magnetic domain. A magnetic head drive signal is newly generated to produce a magnetic field modulated according to a record signal based on the detected optimum phase difference. According to the generated magnetic head drive signal and the first laser drive signal, a magnetic field is applied to the magneto-optical recording medium, and a pulsed laser is directed onto the magneto-optical recording medium to record a signal.

12 Claims, 11 Drawing Sheets

MAGNETO-OPTICAL RECORDING APPARATUS AND METHOD USING PHASE DIFFERENT OPTIMIZATION TECHNIQUE

BACKGROUND OF THE INVENTION

1. Field of the Invention

The present invention relates to a magneto-optical recording apparatus recording a signal onto a magneto-optical recording medium, and a magneto-optical recording method.

2. Description of the Background Art

Attention is focused on a magneto-optical recording medium as a rewritable recording medium of great storage capacity and high reliability. The magneto-optical recording media are now applied as computer memories and the like. Standardization of a magneto-optical recording medium having a storage capacity of 6.0 Gbytes (AS-MO (Advanced Storage Magneto-optical Disk) standard) is in progress to be provided for actual usage. This magneto-optical recording medium of high density has the signal reproduced by the MSR (Magnetically Induced Super Resolution) method. More specifically, a laser beam is projected to transfer the magnetic domain of the recording layer of the magneto-optical recording medium to a reproduction layer and also forming a detection window in the reproduction layer to allow detection of only the transferred magnetic domain. The transferred magnetic domain is detected from the formed detection window.

Also, a magnetic domain enlargement reproduction technique has been developed. An alternating magnetic field is applied in reproducing a signal from a magneto-optical recording medium. The magnetic domain of the recording layer is enlarged to the reproduction layer by the laser beam and the alternating magnetic field while transferring to reproduce a signal. A magneto-optical recording medium that can record or reproduce signals of 14 Gbytes by virtue of this technology has been proposed.

In recording a signal onto such a magneto-optical recording medium, a pulsed laser beam is directed onto the magneto-optical recording medium. A magnetic field modulated according to the record signal is applied onto the magneto-optical recording medium. A magnetic head drive signal that generates a magnetic field modulated according to the record signal is generated delayed by a predetermined time with respect to the laser drive signal that generates a pulsed laser beam.

In the conventional magneto-optical recording, the delay time of the magnetic head drive signal with respect to the laser drive signal is defined constant even if the power of the laser beam is altered. There may be the case where application of the magnetic field to the magneto-optical recording medium ends during the period the temperature of the magneto-optical recording medium is boosted higher than the Curie temperature. In this case, a domain having the desired length cannot be formed. There was a problem that a signal could not be recorded correctly. This tendency is particularly noticeable in forming a domain of short domain length.

SUMMARY OF THE INVENTION

An object of the present invention is to provide a magneto-optical recording apparatus and method that allows a signal to be recorded correctly on a magneto-optical recording medium.

According to an aspect of the present invention, a magneto-optical recording medium includes an optical head, a magnetic head, a drive signal generation circuit, a laser drive circuit, a magnetic head drive circuit, and a phase difference control circuit. The optical head includes a laser generating a pulsed laser beam to be directed onto a magneto-optical recording medium. The magnetic head applies a magnetic field on the magneto-optical recording medium. The drive signal generation circuit generates a laser drive signal and a magnetic head drive signal. The laser drive circuit drives the laser in response to a laser drive signal. The magnetic head drive circuit drives the magnetic head in response to a magnetic head drive signal. The phase difference control circuit controls the phase difference between the laser drive signal and the magnetic head drive signal.

Preferably, the magneto-optical recording apparatus further includes an error correction circuit and a phase difference optimization circuit. The error correction circuit corrects error of a magneto-optical signal applied from the optical head. The phase difference optimization circuit optimizes the phase difference according to the error rate applied from the error correction circuit.

Further preferably, the phase difference control circuit alters the phase difference by every predetermined amount. The phase difference optimization circuit includes an error rate detection circuit and a determination circuit. The error rate detection circuit detects the error rate when the error correction circuit corrects the error of a signal recorded and reproduced with each altered phase difference. The determination circuit determines the optimum phase difference according to the detected error rate.

According to the present invention, a pulsed laser beam is directed onto a magneto-optical recording medium, and a magnetic field is continuously applied to the magneto-optical recording medium until the temperature of the magneto-optical recording medium reaches the maximum temperature exceeding the Curie temperature and then falls to the Curie temperature again. The direction of the magnetic field is inverted after the temperature of the magneto-optical recording medium becomes lower than the Curie temperature. As a result, the signal is recorded in fidelity onto the magneto-optical recording medium.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

Figure 1:
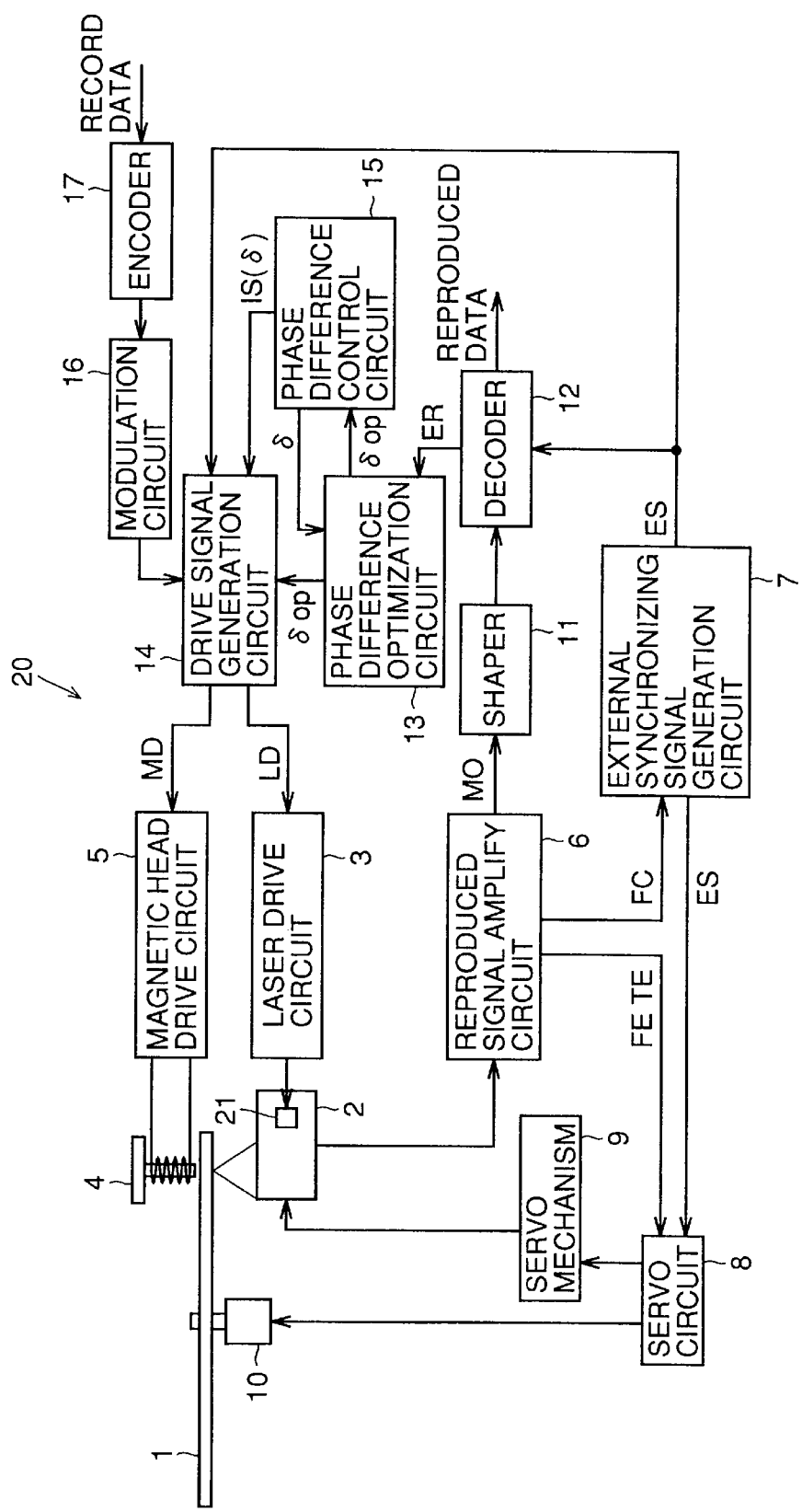
FIG. 1 is a block diagram showing an entire structure of a magneto-optical recording apparatus according to the present invention.

Referring to FIG. 1, a magneto-optical recording apparatus 20 of the present invention includes an optical head 2, a laser drive circuit 3, a magnetic head 4, a magnetic head drive circuit 5, a reproduced signal amplify circuit 6, an external synchronizing signal generation circuit 7, a servo circuit 8, a servo mechanism 9, a spindle motor 10, a shaper 11, a decoder 12, a phase difference optimization circuit 13, a drive signal generation circuit 14, a phase difference control circuit 15, a modulation circuit 16, and an encoder 17.

In recording a signal on a magneto-optical recording medium 1, optical head 2 directs a pulsed laser beam to magneto-optical recording medium 1. In reproducing a signal from magneto-optical recording medium 1, a continuous laser beam is directed and the reflected light detected. Optical head 2 includes a semiconductor laser 21 generating such a laser beam.

Laser drive circuit 3 responds to a laser drive signal LD to drive semiconductor laser 21 in optical head 2. Magnetic head 4 applies a magnetic field on magneto-optical recording medium 1. Magnetic head drive circuit 5 responds to a magnetic head drive signal MD to drive magnetic head 4.

Reproduced signal amplify circuit 6 receives and amplifies to a predetermined value the focus error signal, tracking error signal, fine clock mark signal and magneto-optical signal detected by optical head 2, and provides a focus error signal FE and a tracking error signal TE to servo circuit 8, a fine clock mark signal FC to external synchronizing signal generation circuit 7, and a magneto-optical signal MO to shaper 11. Here, fine clock mark signal FC is a signal detected according to a fine clock mark formed physically at magneto-optical recording medium 1, as will be described afterwards. Magneto-optical signal MO is a signal detected by the magneto-optical (Kerr) effect of a signal recorded at magneto-optical recording medium 1 as a magnetic domain.

External synchronizing signal generation circuit 7 generates an external synchronizing signal ES according to a method that will be described afterwards according to fine clock mark signal FC applied from reproduced signal amplify circuit 6. The generated external synchronizing signal ES is applied to servo circuit 8, decoder 12 and drive signal generation circuit 14.

Servo circuit 8 receives focus error signal FE and tracking error signal TE from reproduce signal amplify circuit 6 and external synchronizing signal ES from external synchronizing signal generation circuit 7. Servo circuit 8 controls servo mechanism 9 according to focus error signal FE and tracking error signal TE, so that spindle motor 10 is rotated at the predetermined rotational frequency according to external synchronizing signal ES.

Servo mechanism 9 provides focus servo and tracking servo of an objective lens (not shown) in magnetic head 2 according to control of servo circuit 8, so that the laser beam is directed onto a predetermined track.

Spindle motor 10 rotates magneto-optical recording medium 1 at a predetermined rotational frequency in synchronization with external synchronizing signal ES according to control of servo circuit 8.

Shaper 11 removes noise of magneto-optical signal MO from reproduced signal amplify circuit 6 and applies A/D conversion. Decoder 12 corrects the error of magneto-optical signal MO from shaper 11 and provides the corrected signal as reproduced data.

Phase difference optimization circuit 13 alters the phase difference δ between the rise of laser drive signal LD to generate a pulsed laser beam and the fall of magnetic head drive signal MD to generate a magnetic field modulated according to a record signal to record a domain of a predetermined length at magneto-optical recording medium 1. Phase difference optimization circuit 13 receives from decoder 12 the magneto-optical signal when reproduced to detect the error rate ER of the received magneto-optical signal. Phase difference optimization circuit 13 detects an optimum phase difference δop corresponding to an error rate that is lower than a predetermined reference rate and that takes the smallest value. The detected optimum phase difference δop is provided to drive signal generation circuit 14 and phase difference control circuit 15.

In determining the optimum phase difference, drive signal generation circuit 14 responds to a designation signal IS from phase difference control circuit 15 to generate laser drive signal LD in synchronization with external synchronizing signal ES from external synchronizing signal generation circuit 7, and alters the phase difference between the rise of the generated laser drive signal LD and the fall of magnetic head drive signal MD to generate a magnetic head drive signal MD. Drive signal generation circuit 14 provides the generated laser drive signal LD to laser drive circuit 3 and the generated magnetic head drive signal MD to magnetic head drive circuit 5. In this case, designation signal IS from phase difference control circuit 15 includes the phase difference δ between the rise of laser drive signal LD and fall of magnetic head drive signal MD to be altered.

Upon receiving the determined optimum phase difference δop from phase difference optimization circuit 13 and designation signal IS from phase difference control circuit 15, drive signal generation circuit 14 sets the phase difference δ between the rise of laser drive signal LD and the fall of magnetic head drive signal MD to the determined optimum phase difference δop, and generates a magnetic head drive signal MD modulated according to the record signal from modulation circuit 16. The generated magnetic head drive signal MD is provided to magnetic head drive circuit 5. In this case, laser drive circuit 3 receives a laser drive signal LD identical to the first generated laser drive signal LD.

In determining optimum phase difference δop, phase difference control circuit 15 provides designation signal IS to drive signal generation circuit 14 and a phase difference δ to be altered to phase difference optimization circuit 13 so that the phase difference between the rise of laser drive signal LD and the fall of magnetic head drive signal MD is altered to produce magnetic head drive signal MD.

Upon receiving the determined optimum phase difference δop from phase difference optimization circuit 13, phase difference control circuit 15 provides designation signal IS to drive signal generation circuit 14 so as to generate a magnetic head drive signal MD at the determined optimum phase difference δop.

Modulation circuit 16 modulates the record signal from encoder 17 according to a predetermined system. Encoder 17 encodes the record data.

The basic principle of the present invention will be described with reference to FIGS. 2, 3A, 3B and FIGS. 4A and 4B. When magneto-optical recording medium 1 is irradiated with a laser beam pulsed at a predetermined duty, the temperature of magneto-optical recording medium 1 changes over time as shown by curves k1, k2 and k3 in FIG. 2. More specifically, the temperature of magneto-optical recording medium 1 begins to rise in response to irradiation with the pulsed laser beam and then arrives at the Curie temperature Tc of 300° C. The temperature further rises to reach the maximum temperature, and then falls to become lower than the Curie temperature Tc of 300° C. The time to arrive at Curie temperature Tc differs depending upon the power of the pulsed laser beam directed to magneto-optical recording medium 1. The time varies as curves k1, k2 and k3 in the descending order of power. For example, the temperature changes as curve k1 when the power of the pulsed laser beam is approximately 12–13 mV. The temperature changes as in curve k2 and curve k3 when the power of the laser beam is approximately 10 mV and approximately 8–9 mV, respectively.

In the case where the temperature of magneto-optical recording medium 1 changes as shown in curve k1, magneto-optical recording medium 1 corresponds to Curie temperature Tc at point a1, and Curie temperature Tc again at point a2. When the temperature of magneto-optical recording medium 1 changes as curve k2, magneto-optical recording medium 1 corresponds to Curie temperature Tc at point b1 and again at point b2. In the case where the temperature of magneto-optical recording medium 1 changes as in curve k3, magneto-optical recording medium 1 corresponds to Curie temperature Tc at point c1 and again at point c2. Thus, the period of time magneto-optical recording medium 1 is higher than Curie temperature Tc differs depending upon the power of the laser beam directed onto magneto-optical recording medium 1. This period of time becomes longer as a function of higher power. Curie temperature Tc corresponds to the temperature where magnetization on magneto-optical recording medium 1 disappears. In applying a magnetic field onto magneto-optical recording medium 1 to record a signal, the magnetic field is applied to magneto-optical recording medium 1 under the state where the temperature of magneto-optical recording medium 1 is boosted higher than Curie temperature Tc, and application of the magnetic field is ended at the time point the temperature of magneto-optical recording medium 1 becomes lower than Curie temperature Tc. Thus, a magnetic domain having magnetization in a direction identical to that of the applied magnetic field is formed at magneto-optical recording medium 1.

Therefore, a magnetic domain having magnetization in a direction identical to that of the applied magnetic field cannot be formed correctly at magneto-optical recording medium 1 unless an external magnetic field is applied at the time the temperature of magneto-optical recording medium 1 arrives at points a2, b2 and c2.

Details will be provided hereinafter.

In the case where the temperature of magneto-optical recording medium 1 is altered over time according to curve k1 due to projection of laser beam PLB, the time of the temperature of magneto-optical recording medium 1 arriving at point a2 is set T1, and the time of ending application of a magnetic field Hex to form a magnetic domain is set T2. When time T2 is behind time T1 (T1<T2), magnetic field Hex to form a magnetic domain is still applied during time T2−T1 even if the temperature of magneto-optical recording medium 1 passes through point a2 to become lower than Curie temperature Tc. A magnetic domain 31 having magnetization 32 in a direction identical to that of external magnetic field Hex is formed at a magnetic layer 30 of magneto-optical recording medium 1.

Figure 4A:
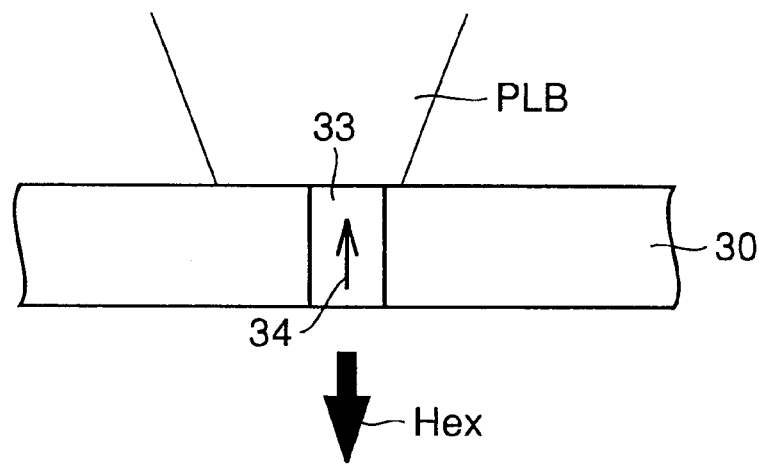
FIGS. 4A and 4B show an operation that is not preferable where the magnetic field is inverted prior to the temperature of the magneto-optical recording medium falling lower than the Curie temperature.
Figure 4B:
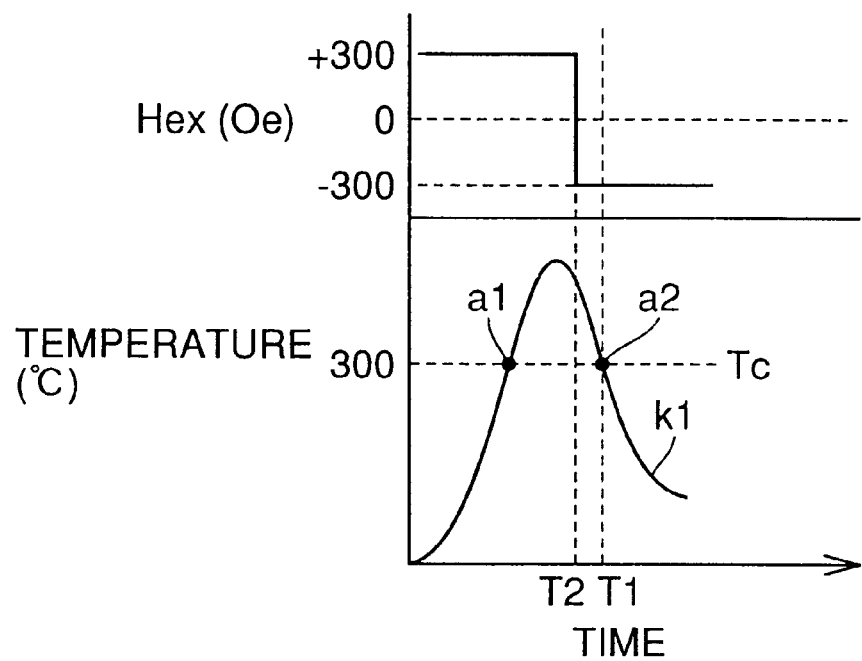

FIGS. 4A and 4B correspond to the case where time T2 is earlier than time T1 (T1>T2). Since application of magnetic field Hex ends prior to the temperature of magneto-optical recording medium 1 passing through point a2, a magnetic domain 33 having magnetization 34 in a direction opposite to that of external magnetic domain Hex is formed at magnetic layer 30 of magneto-optical recording medium 1 due to influence from a magnetic domain or the like that is present in a region other than the region where the magnetic domain is to be formed. Even if a magnetic domain having magnetization in a direction opposite to that of external magnetic field Hex is not generated, the desirable magnetic domain having magnetization in a direction identical to that of external magnetic field Hex will not be formed at the least. Therefore, a signal cannot be recorded correctly.

Figure 2:
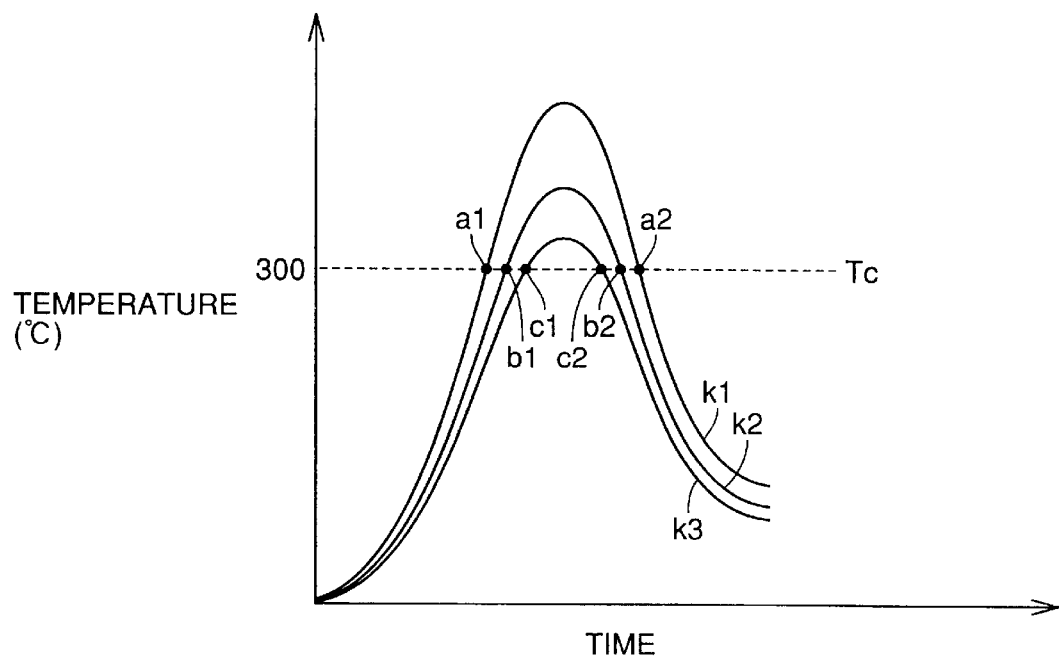
FIG. 2 is a diagram showing temperature change in a magneto-optical recording medium irradiated with a pulsed laser beam.
Figure 3A:
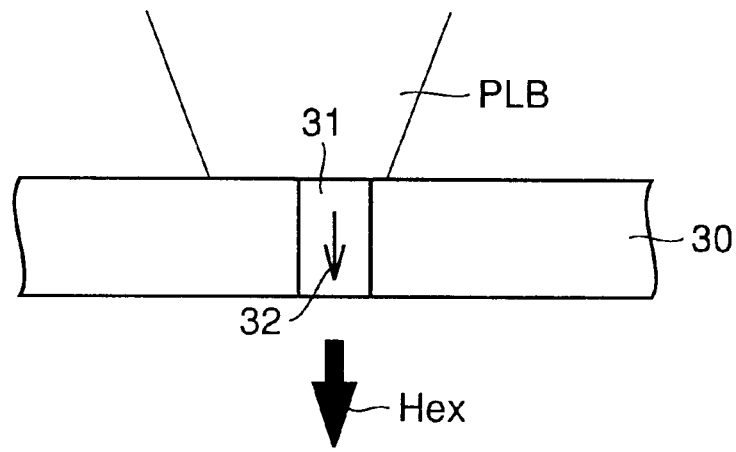
FIGS. 3A and 3B show a preferable operation where the magnetic field is inverted after the temperature of the magneto-optical recording medium becomes lower than the Curie temperature.
Figure 3B:
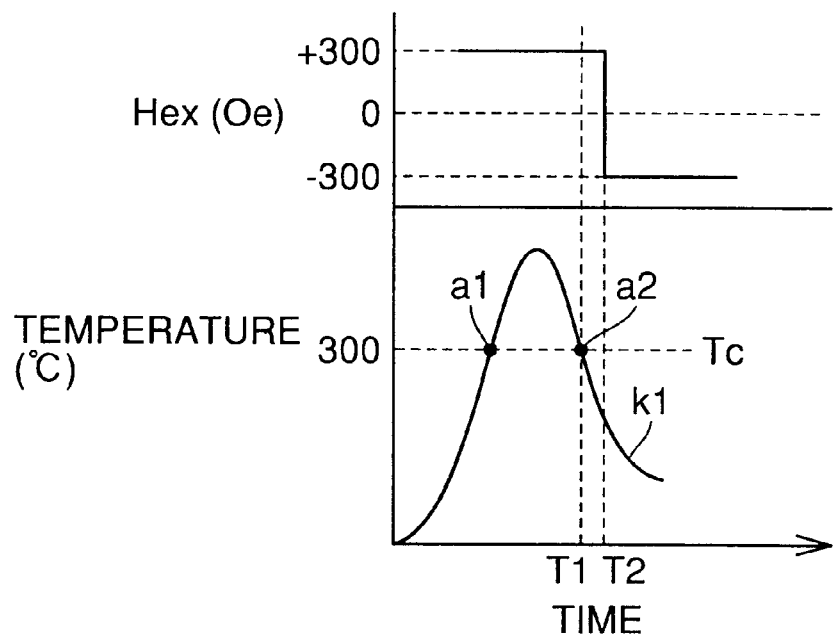

In this case, the time of magneto-optical recording medium 1 arriving at the temperature of Curie temperature Tc will vary according to the power of the laser beam as apparent from FIG. 2. Therefore, the time of magneto-optical recording medium 1 arriving at the temperature corresponding to points a2, b2 and c is to be detected by some way in order to record the signal properly.

Figure 6:
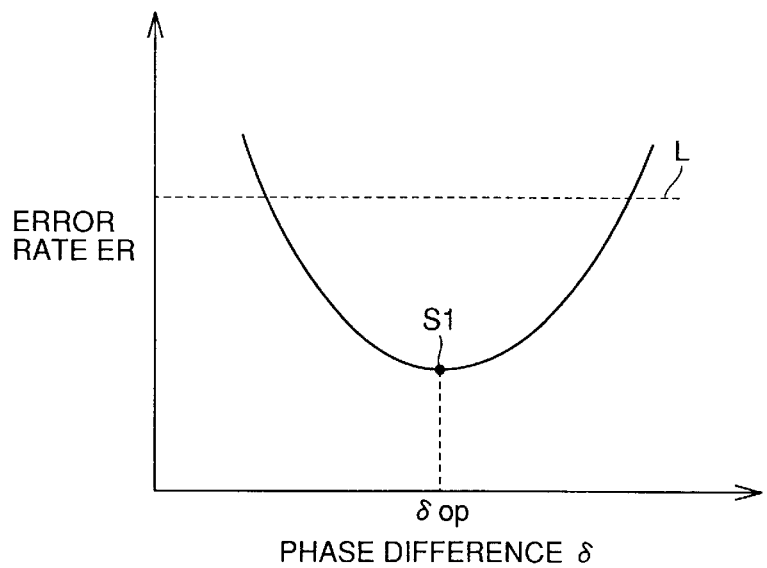
FIG. 6 is a diagram representing the dependency of the error rate on the phase difference.

However, it is generally difficult to detect this time. In the present invention, the phase difference between the rise of laser drive signal LD to generate a pulsed laser beam and the fall of magnetic head drive signals MD1–MD3 to generate a magnetic field to form a magnetic domain is altered as δ1, δ2, δ3 to form a magnetic domain of respective predetermined length at magneto-optical recording medium 1. An error rate ER of magneto-optical signal MO obtained from the formed magnetic domain is detected. By plotting the detected error rate ER over the phase difference δ, the characteristic diagram of a parabola with a convex downwards as shown in FIG. 6 is obtained. The phase difference δ corresponding to error rate ER below a predetermined reference rate L and also corresponding to smallest point S1 is determined as the optimum phase difference δop. Laser drive signal LD and magnetic head drive signal MD are generated according to the determined optimum phase difference δop. By emitting a pulsed laser beam according to the determined laser drive signal LD and magnetic head drive signal MD and applying a magnetic field, a desired magnetic domain can be formed on magneto-optical recording medium 1.

In determining phase difference δ between the rise of laser drive signal LD and the fall of magnetic head drive signal MD, the length of the magnetic domain recorded at magneto-optical recording medium 1 has the shortest domain length T or the double length 2T in the present invention. In the case where the modulation system of the record signal is the NRZI+system, a magnetic domain of 2T in length will be formed since the shortest magnetic domain cannot be actually recorded on magneto-optical recording medium 1. The error rate of the reproduced signal is deteriorated in proportion to a shorter magnetic domain unless the magnetic domain is correctly formed over the entire region. Signal recording of high fidelity cannot be effected as a whole unless the magnetic domain is formed correctly as the magnetic domain becomes shorter. It is for this reason that a magnetic domain of short length is recorded to determine phase difference δ.

Figure 5:
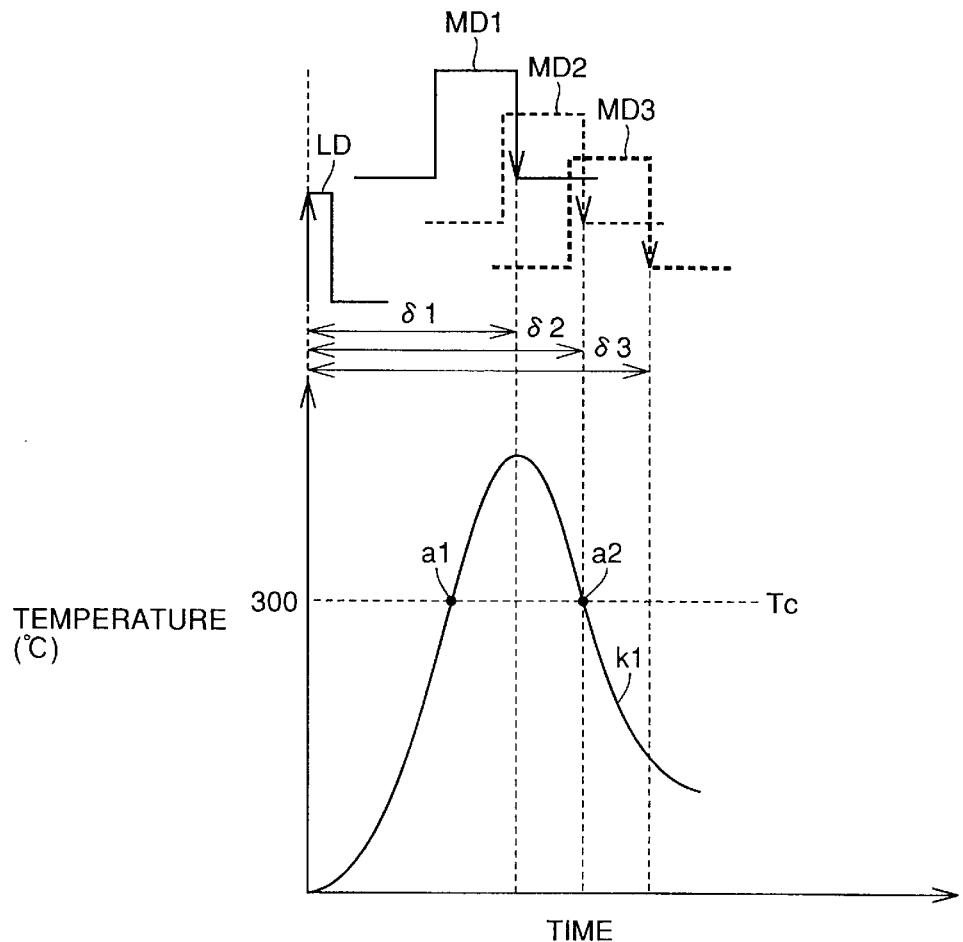
FIG. 5 is a diagram to describe a method of determining a phase difference corresponding to the smallest error rate.

The operation of determining optimum phase difference δop between the rise of laser drive signal LD and the fall of magnetic head drive signal MD described with reference to FIGS. 5 and 6 is carried out by phase difference optimization circuit 13 of magneto-optical recording apparatus 20 of FIG. 1.

Figure 7:
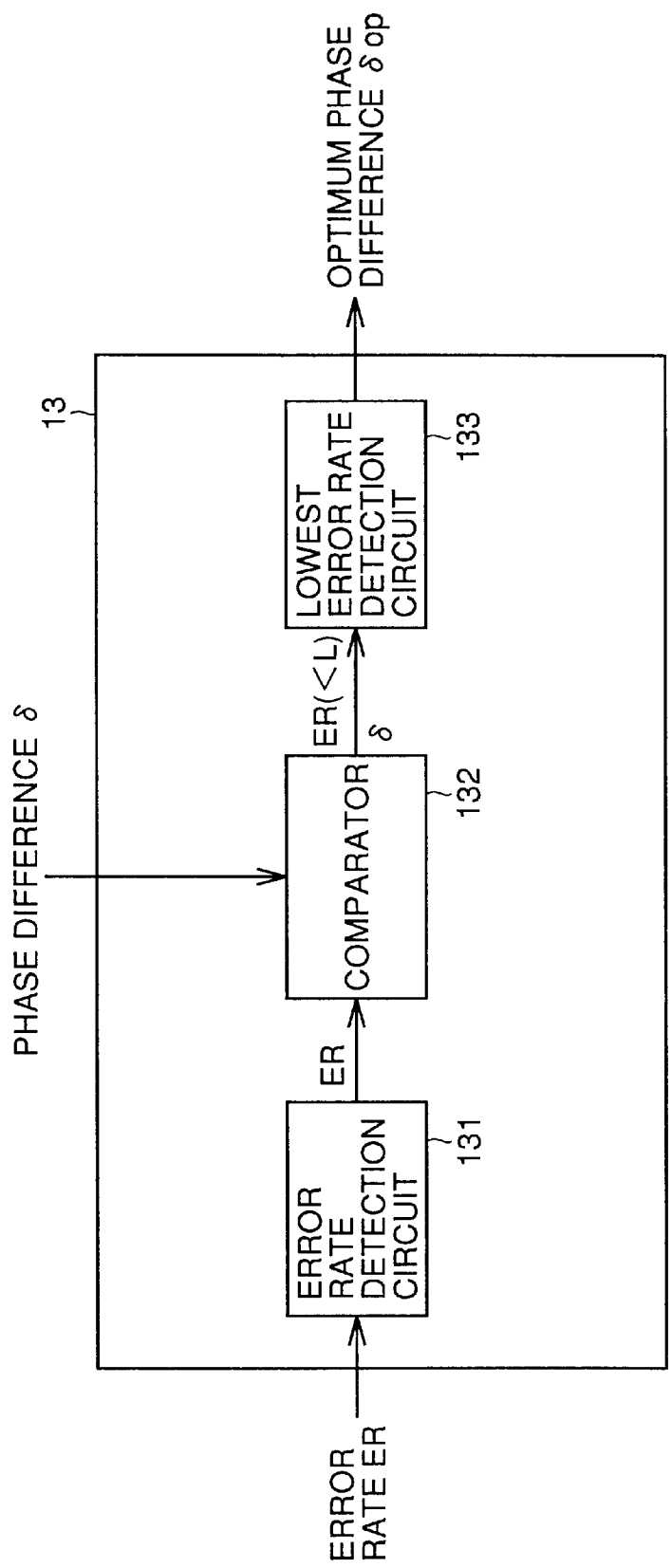
FIG. 7 is a block diagram showing a structure of a phase difference optimization circuit of the magneto-optical recording apparatus of FIG. 1.

The structure of phase difference optimization circuit 13 will be described with reference to FIG. 7. Phase difference optimization circuit 13 includes an error rate detection circuit 13, a comparator 132, and a lowest error rate detection circuit 133. Error rate detection circuit 131 detects error rate ER from decoder 12. Comparator 132 receives an error rate ER from error rate detection circuit 131 and also phase difference δ from phase difference control circuit 15 of magneto-optical recording apparatus 20 in FIG. 1. Comparator 132 compares each detected error rate ER with a predetermined reference rate L to establish correspondence between an error rate ER that is lower than reference rate L and phase difference δ. Comparator 132 plots error rate ER over each phase difference δ and provides an error rate ER below predetermined reference rate L together with a corresponding phase difference δ to lowest error rate detection circuit 133. Lowest error rate detection circuit 133 detects the lowest error rate from the input error rates ER, and identifies phase difference δ corresponding to the detected lowest error rate. Lowest error rate detection circuit 133 provides the detected phase difference δ as optimum phase difference δop to drive signal generation circuit 14 and phase difference control circuit 15 of magneto-optical recording apparatus 20 of FIG. 1.

The dependency of error rate ER on phase difference δ corresponding to reproduction of a signal recorded with the phase difference altered will be described with reference to FIG. 8. Here, the power of the laser beam is varied to 8.0 mW (●), 10.25 mW (□) and 11.8 mW (▲). When the power of the laser beam is 8.0 mW(●), error rate ER becomes lower than $10^{-4}$ in the phase difference δ range of 10–23. In this case, the phase difference δ in the range of 15–20 where error rate ER becomes lowest in the range below $10^{-4}$ is selected.

When the power of the laser beam is 10.25 mW (□), error rate ER becomes lower than $10^{-4}$ in the phase difference δ range of 10–38. In this case, phase difference δ in the range of 25–30 where error rate ER becomes lowest in the region below $10^{-4}$ is selected.

When the power of the laser beam is 11.8 mW (▲), error rate ER becomes lower than $10^{-4}$ in the phase difference δ range of 28–42. In this case, the phase difference δ in the range of 35–36 where the error rate ER is lowest in the range below $10^{-4}$ is selected.

Figure 8:
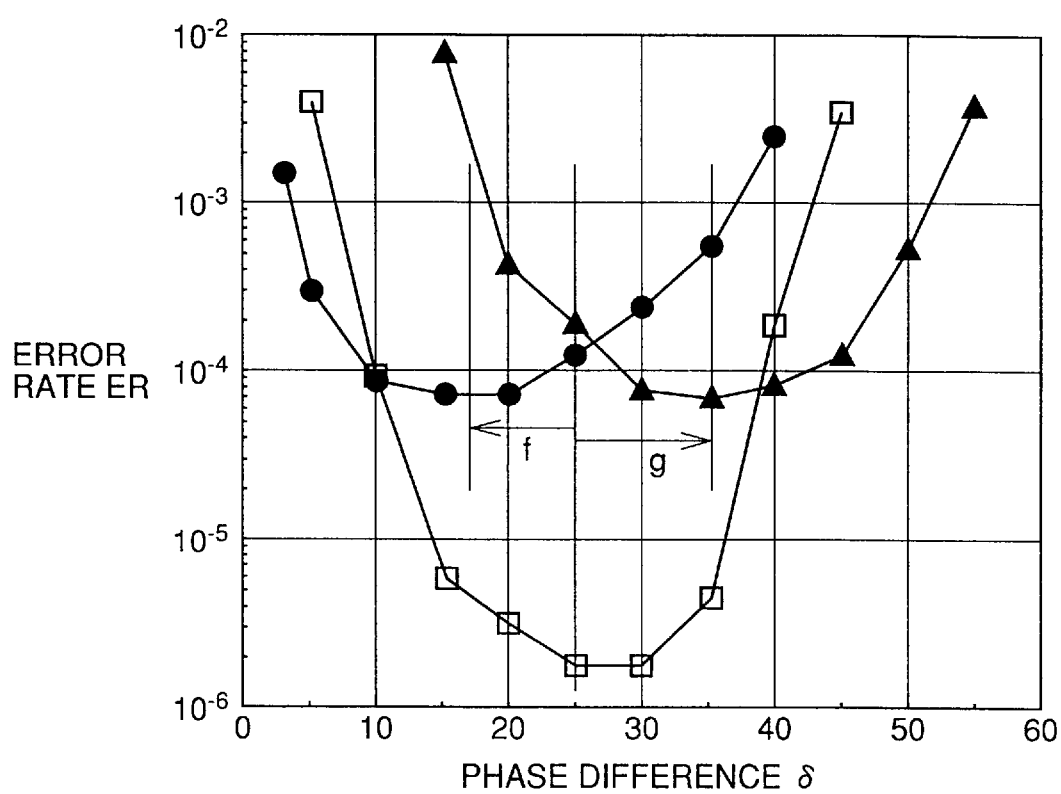
FIG. 8 represents results of an experiment showing the relationship between error rate and phase difference.

It is appreciated from FIG. 8 that the detected error rate differs greatly depending upon the power of the laser beam. It is therefore desirable to determine the phase difference between laser drive signal LD and magnetic head drive signal MD after the power of the laser beam to be directed to magneto-optical recording medium 1 has been determined.

The foregoing error rate indicates the overall error rate including error rates in signal processing of each of optical head 2, reproduced signal amplify circuit 6, shaper 11 and decoder 12 of magneto-optical recording apparatus 20 of FIG. 1.

Figure 9:
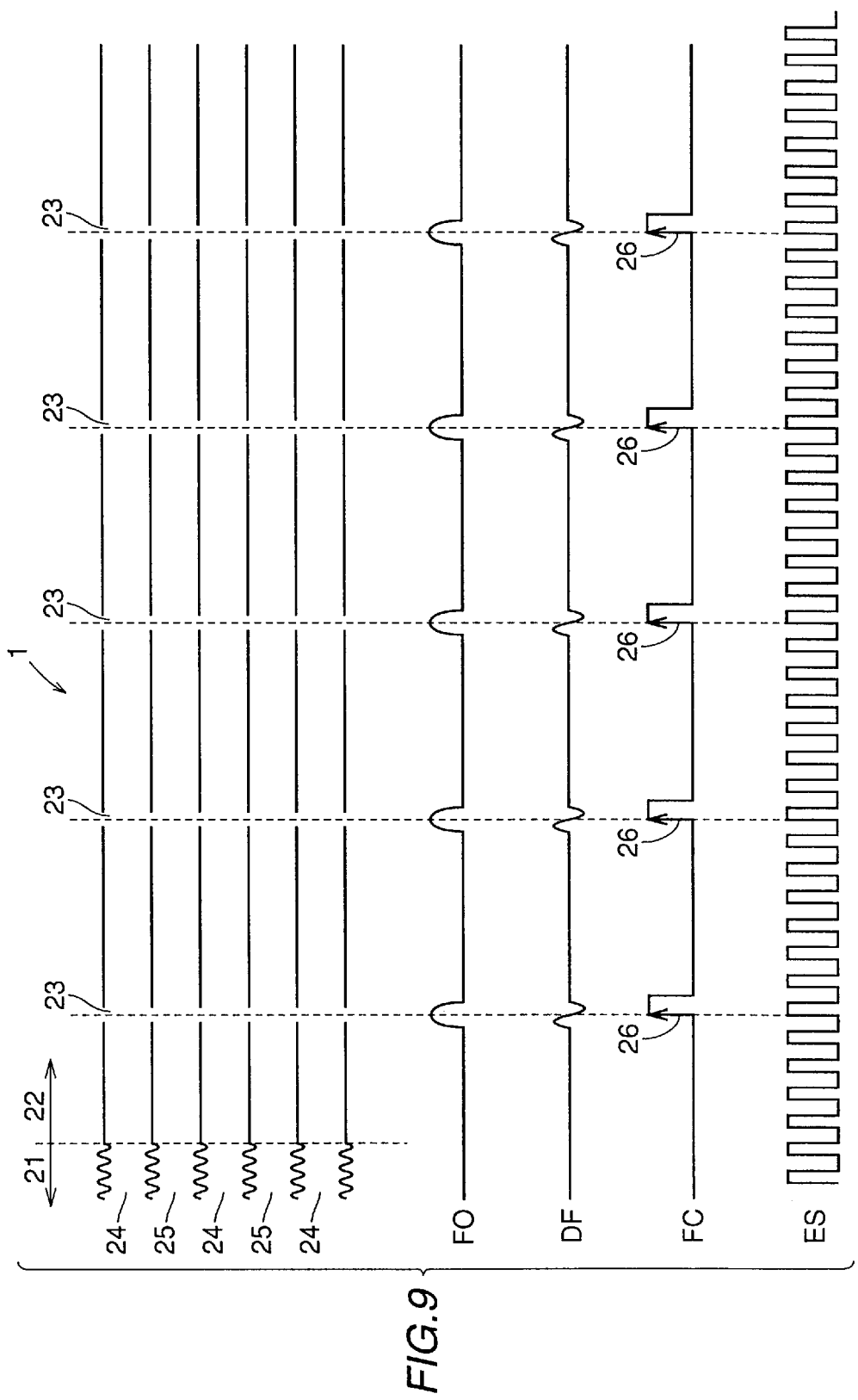
FIG. 9 is a timing chart representing an operation of an external synchronizing signal generation circuit of the magneto-optical recording apparatus of FIG. 1.

In magneto-optical recording apparatus 20 of the present invention, laser drive signal LD is generated in synchronization with external synchronizing signal ES. Generation of external synchronizing signal ES will be described with reference to FIG. 9. Magneto-optical recording medium 1 is formed with a concentric or spiral land and track corresponding to a groove. The plane structure includes an intermittent region (fine clock mark) 23 at a constant interval in addition to a land 24 and a groove 25. Address information is recorded in wobble at the wall of both sides of groove 25 in an address region 21. This means that both sides of land 24 is provided with wobble. Address information can be detected in either case of the laser beam running on groove 25 or land 24. It is to be noted that the walls at both sides of groove 25 in data region 22 are not formed with the wobble. Since fine clock mark 23 is provided at a constant interval in magneto-optical recording medium 1, fine clock mark 23 can be detected by the laser beam and used as a synchronizing signal for recording or reproducing a signal.

As the laser beam runs along groove 25, the reflected light is detected as a signal FO. A signal DF is obtained by differentiating signal FO. A fine clock mark signal FC having a rise 26 in synchronization with the timing of the differential component of signal DF switched to minus from plus is generated. External synchronizing signal ES is generated so that there are a predetermined number of clocks between each fine clock signal FC. This operation is carried out by external synchronizing signal generation circuit 7 of magneto-optical recording apparatus 20 of FIG. 1.

Figure 10:
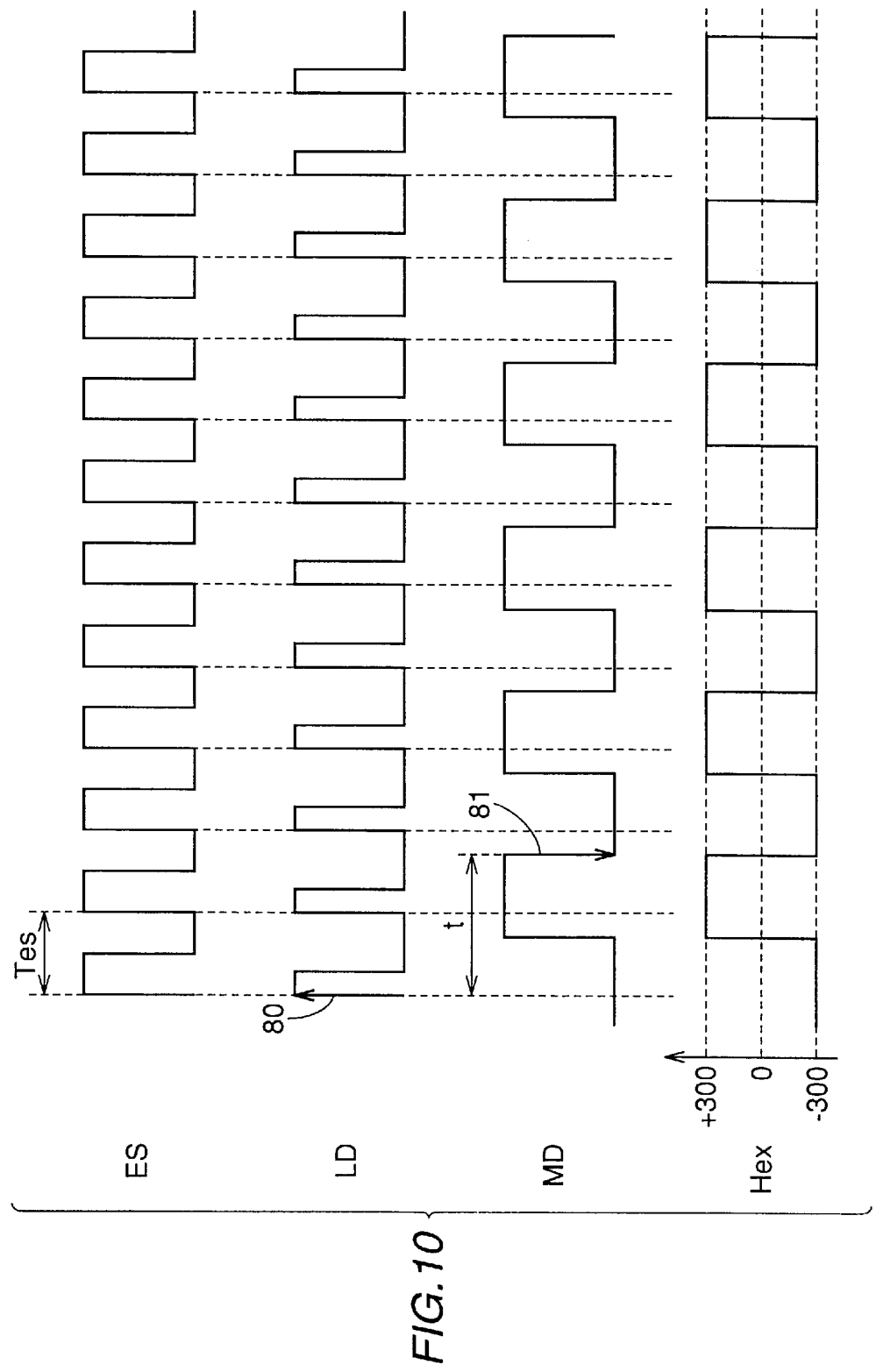
FIG. 10 is a timing chart of an external synchronizing signal, a laser drive signal, a magnetic head drive signal and an external magnetic field.

Referring to FIG. 10, laser drive signal LD is generated in synchronization with external synchronizing signal ES. External synchronizing signal ES has a frequency of 21.3 MHz, and the time of one cycle corresponds to 47 ns. Since laser drive signal LD is generated at the duty of 3:7, for example, the turn on time of the laser beam is 47 ns×0.3=14 ns, and the off-time of the laser beam is 47 ns×0.7=33 ns. Magnetic head drive signal MD is generated to have a fall 81 corresponding to time t from rise 80 of laser drive signal LD. Magnetic field Hex that is to be applied to magneto-optical recording medium 1 is generated according to this magnetic head drive signal MD. Time t is defined as the time difference between rise 80 of laser drive signal LD and fall 81 of magnetic head drive signal MD. Alternatively, since laser drive signal LD is in synchronization with external synchronizing signal ES, the phase difference with external synchronizing signal ES can be taken as time difference t.

The operation of optimizing phase difference δ will be described with reference to FIGS. 1 and 11. Upon loading magneto-optical recording medium 1, a laser beam is continuously directed to magneto-optical recording medium 1 from optical head 2, whereby focus error signal FE, tracking error signal TE, and fine clock mark signal FC are detected. External synchronizing signal ES is generated according to fine clock mark signal FC. The objective lens (not shown) in optical head 2 is subjected to focus servo and tracking servo. Magneto-optical recording medium 1 is rotated at a predetermined rotational speed (S1). Then, phase difference control circuit 15 sets phase difference δ between laser drive signal LD to generate a pulsed laser beam and magnetic head drive signal MD to generate a magnetic field to form the shortest magnetic domain or a domain of 2T for initial phase difference $δ_o$, and provides a designation signal IS to drive signal generation circuit 14 to generate drive signals LD and MD (S2).

Drive signal generation circuit 14 generates laser drive signal LD and magnetic head drive signal MD according to designation signal IS from phase difference control circuit 15. Laser drive signal LD is provided to laser drive circuit 3. Magnetic head drive signal MD is provided to magnetic head drive circuit 5. Laser drive circuit 3 drives semiconductor laser 21 in optical head 2 according to laser drive signal LD. Optical head 2 emits a pulsed laser beam to magneto-optical recording medium 1. Magnetic head drive circuit 5 drives magnetic head 4 according to magnetic head drive signal MD. Magnetic head 4 applies a magnetic field to form the shortest magnetic domain or a domain of 2T at magneto-optical recording medium 1. The shortest magnetic domain or a domain of 2T is formed at magneto-optical recording medium 1 with the time of terminating application of the magnetic field altered (signal recording: S3).

Following formation of a magnetic domain of a predetermined length, a laser beam is continuously emitted from optical head 2 to magneto-optical recording medium 1 without application of a magnetic field from magnetic head 4. The magnetic domain formed at magneto-optical recording medium 1 is detected (signal reproduction: S4).

Magneto-optical signal MO detected by optical head 2 is decoded by decoder 12. Error rate ER thereof is applied to phase difference optimization circuit 13. In phase difference optimization circuit 13 of FIG. 7, error rate detection circuit 131 detects the applied error rate ER (S5). Comparator 132 compares the detected error rate ER with reference rate L. An error rate ER lower than reference rate L (<L) is related with phase difference $\delta$ applied from phase difference control circuit 15. The correspondence therebetween is stored in a memory (not shown) (S6).

Phase difference control circuit 10 determines whether the current phase difference $\delta$ is smaller than $\delta_o$+Tes (S7). When $\delta_o$+Tes>$\delta$, phase difference control circuit 15 increases current phase difference $\delta$ by a predetermined amount Tes/n (S8). Here, Tes is the cycle of external synchronizing signal ES, and n is a predetermined natural number. In this case, steps S3–S6 are repeated.

When $\delta_o$+Tes$\leq\delta$, lowest error rate detection circuit 13 detects the lowest error rate from the applied error rates that are lower than reference rate L. The phase difference corresponding to that lowest error rate is determined as optimum phase difference $\delta$op (S9). The determined optimum phase difference $\delta$op is applied to drive signal generation circuit 14 and phase difference control circuit 15. As a result, magneto-optical recording apparatus 20 records an externally applied signal with optimum phase difference $\delta$op on magneto-optical recording medium 1. The normal recording operation will be described hereinafter.

Phase difference control circuit 15 receiving optimum phase difference $\delta$op from phase difference optimization circuit 13 provides designation signal IS to drive signal generation circuit 14 so as to generate laser drive signal LD and magnetic head drive signal MD with optimum phase difference $\delta$op.

The record data is encoded by encoder 17 and modulated according to a predetermined system at modulation circuit 16. The modulated data is provided to drive signal generation circuit 16. Upon receiving designation signal IS from phase difference control circuit 15, drive signal generation circuit 14 generates magnetic head drive signal MD that is modulated according to the record signal from modulation circuit 16 and that is set with optimum phase difference $\delta$op from phase difference optimization circuit 13. Drive signal generation circuit 14 provides laser drive signal LD to laser drive circuit 3 and magnetic head drive signal MD to magnetic head drive circuit 5.

Laser drive circuit 3 drives semiconductor laser 21 in optical head 2 according to laser drive signal LD. Optical head 2 emits a pulsed laser beam to magneto-optical recording medium 1. Magnetic head drive circuit 5 drives magnetic head 4 according to magnetic head drive signal MD modulated according to the record signal and set with optimum phase difference $\delta$op. A magnetic field modulated according to the record signal is applied from magnetic head 4 to magneto-optical recording medium 1. As a result, a record signal is recorded at magneto-optical recording medium 1 in fidelity.

The present invention is not limited to the above-described embodiment. Phase difference optimization circuit 13 and phase difference control circuit 15 may be formed of a DSP (digital Signal Processor) to execute the process shown in FIG. 12.

Figure 12:
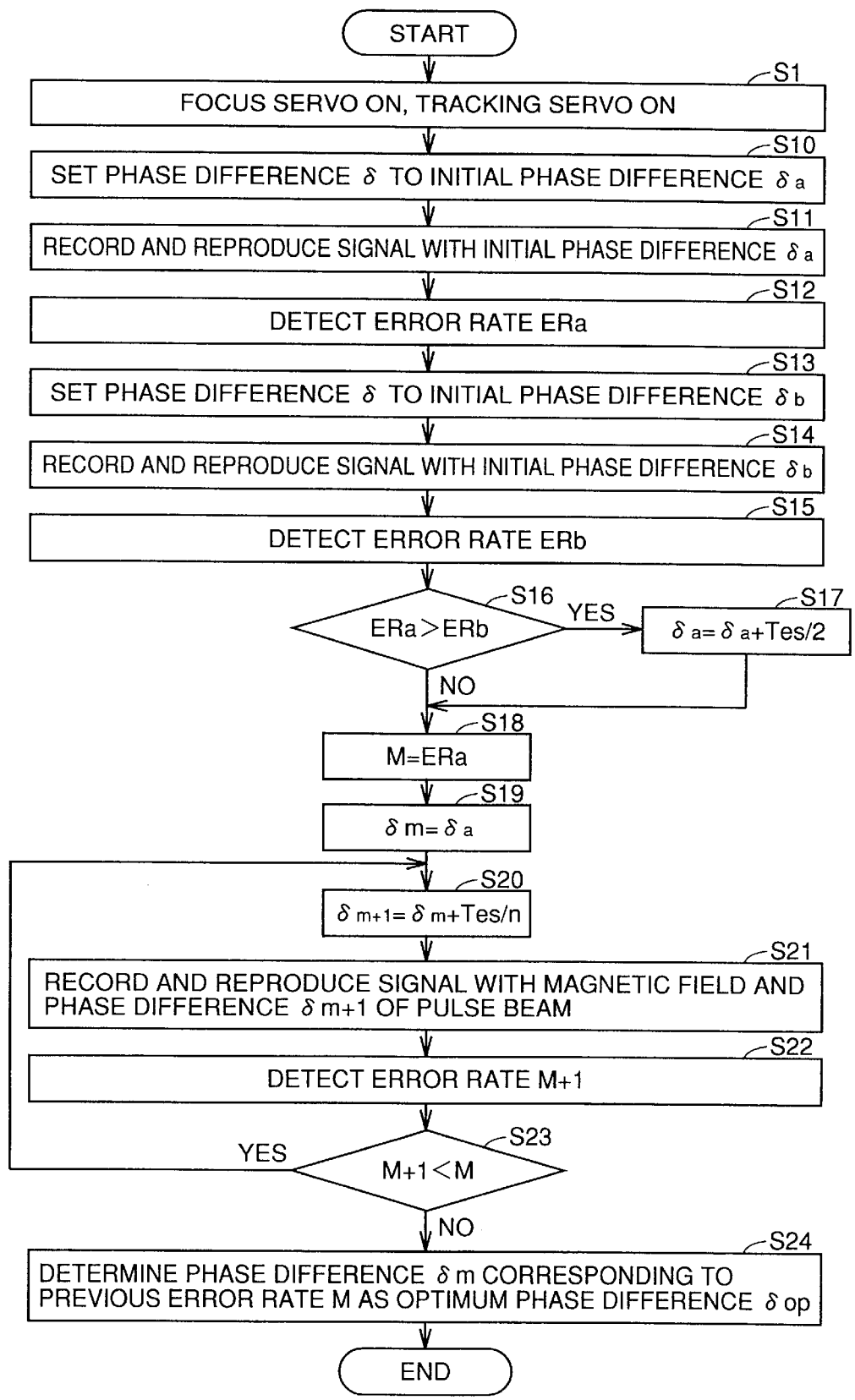
FIG. 12 is a flow chart alternative to FIG. 11.

Referring to FIG. 12, the DSP sets phase difference $\delta$ in initial phase difference $\delta a$ (S10). A signal is recorded and reproduced with this initial phase difference $\delta a$ (S11). Error rate ERa when the error of the reproduced signal was corrected by decoder 12 is detected (S12).

Then, the DSP sets phase difference $\delta$ in initial phase difference $\delta b$ (S13). A signal is recorded and reproduced with this initial phase difference $\delta b$ (S14). An error rate ERb when the error of the reproduced signal is corrected by decoder 12 is detected (S15). Here, $\delta b = \delta a + Tes/n$.

The DSP determines whether error rate ERa is smaller than error rate ERb (S16). When ERa<ERb, phase difference $\delta$ is increased by a predetermined amount Tes/2 (S17). When ERa$\geq$ERb, control proceeds to step S18. The reason why initial phase difference $\delta a$ is shifted by half a cycle Tes/2 of external synchronizing signal ES (laser drive signal LD) is set forth in the following. When initial phase differences $\delta a$ and $\delta b$ set at steps S10 and S13, respectively, are located at the left side of optimum phase difference $\delta$op shown in FIG. 6, optimum phase difference $\delta$op is attained immediately by increasing the phase difference by every predetermined amount at step S20 that will be described afterwards. However, in the case where initial phase differences $\delta a$ and $\delta b$ are located at the right side of optimum phase difference $\delta$op in FIG. 6, optimum phase difference $\delta$op arrival at optimum phase difference $\delta$op is time-consuming if the phase difference is increased by every predetermined amount.

Then, the DSP stores error rate ERa in a memory M (S18). Initial phase difference $\delta a$ is stored in a memory $\delta m$ (S19).

The current phase difference $\delta m$ stored in this memory is increased by a predetermined amount Tes/n (S20). Magneto-optical recording apparatus 20 records and reproduces the signal with the increased phase difference $\delta m+1$ (S21). When decoder 12 corrects the error of the reproduced signal, the DSP detects the error rate M+1 applied from decoder 12 (S22). The DSP determines whether the detected current error rate M+1 is smaller than the previous error rate M. When M+1<M, the steps of S20–S22 are repeated. When M+1$\leq$M, control proceeds to step S24.

In the case where current error rate M+1 is higher than the previous error rate, the DSP determines phase difference $\delta m$ corresponding to the previous error rate M as optimum phase difference $\delta$op (S24).

Figure 11:
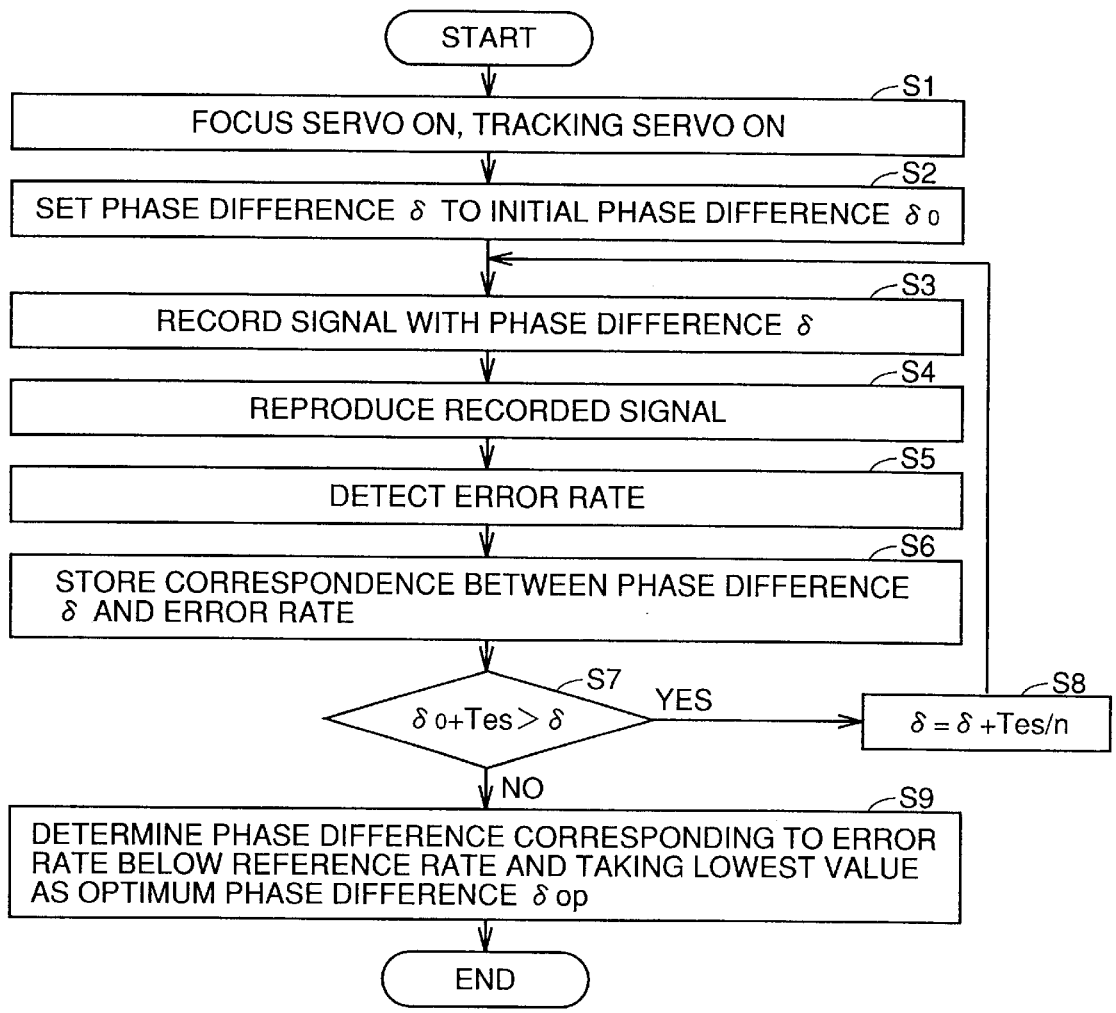
FIG. 11 is a flow chart representing an operation of the phase difference optimization circuit and phase difference control circuit of the magneto-optical recording apparatus of FIG. 1.

The optimum phase error $\delta$op corresponding to the lowest error rate ER can be determined by the method of FIG. 12, similar to the method of FIG. 11.

In the above embodiment, the phase difference corresponding to the lowest error rate ER is taken as optimum phase difference $\delta$op. However, optimum phase difference $\delta$op does not necessarily have to correspond to the lowest error rate ER as long as error rate ER is below reference rate L.

Alternatively, by plotting error rate ER over a phase difference $\delta$, the average phase difference of the phase difference when error rate ER is below reference rate L and the phase difference when error rate ER exceeds reference rate L can be taken as optimum phase difference δop.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording apparatus comprising:
   an optical head including a laser generating a pulsed laser beam to be directed to a magneto-optical recording medium,
   a magnetic head applying a magnetic field to said magneto-optical recording medium,
   a drive signal generation circuit generating a laser drive signal and a magnetic head drive signal,
   a laser drive circuit driving said laser in response to said laser drive signal,
   a magnetic head drive circuit driving said magnetic head in response to said magnetic head drive signal, and
   a phase difference control circuit controlling a phase difference between a rise of said laser drive signal and a fall of said magnetic head drive signal.

2. The magneto-optical recording apparatus according to claim 1, further comprising:
   an error correction circuit correcting error of a magneto-optical signal applied from said optical head, and
   a phase difference optimization circuit optimizing said phase difference according to an error rate applied from said error correction circuit.

3. The magneto-optical recording apparatus according to claim 2, wherein said phase difference control circuit alters said phase difference by each predetermined amount,
   wherein said phase difference optimization circuit comprises
      an error rate detection circuit detecting an error rate when said error correction circuit corrects error of a signal recorded and reproduced with said altered phase difference, and
      determination means for determining an optimum phase difference according to said detected error rate.

4. The magneto-optical recording apparatus according to claim 3, wherein said determination means comprises a comparator comparing said detected each error rate with a reference rate, and establishing correspondence between an error rate lower than said reference rate and a phase difference applied from said phase difference control circuit.

5. The magneto-optical recording apparatus according to claim 4, wherein said determination means further comprises a lowest error rate detection circuit detecting the lowest error rate among error rates applied from said comparator lower than said reference rate, and determining the phase difference corresponding to the lowest error rate as said optimum phase difference.

6. The magneto-optical recording apparatus according to claim 3, wherein said determination means determines, when said detected current error rate is higher than the previous error rate, the phase difference corresponding to said previous error rate as said optimum phase difference.

7. The magneto-optical recording apparatus according to claim 6, wherein said phase difference control circuit further comprises means for setting said phase difference to a first initial phase difference,
   means for detecting a first error rate when said error correction circuit corrects an error of a signal recorded and reproduced with said first initial phase difference,
   means for setting said phase difference to a second initial phase difference differing from said first initial phase difference by said predetermined amount,
   means for detecting a second error rate when said error correction circuit corrects error of a signal recorded and reproduced with said second initial phase difference, and
   means for shifting said first initial phase difference by half a cycle of said laser drive signal when said first error rate is lower than said second error rate.

8. In a magneto-optical recording apparatus including an optical head with a laser generating a pulsed laser beam to be directed to a magneto-optical recording medium, and a magnetic head applying a magnetic field to said magneto-optical recording medium, a method of optimizing phase difference between a rise of a signal to drive said laser and a fall of a signal to drive said magnetic head, said method comprising the steps of;
   altering said phase difference by each predetermined amount,
   recording and reproducing a signal with each said altered phase difference,
   correcting error of said reproduced signal,
   detecting an error rate when said error is corrected, and
   determining an optimum phase difference according to said detected error rate.

9. The method according to claim 8, wherein said step of determining determines as said optimum phase difference the phase difference corresponding to an error rate lower than a reference rate out of said determined error rates.

10. The method according to claim 8, wherein said step of determining determines as said optimum phase difference the phase difference corresponding to the lowest error rate out of said detected error rates.

11. The method according to claim 8, wherein said step of determining determines as said optimum phase difference the phase difference corresponding to a previous error rate when said detected current error rate is higher than said previous error rate.

12. The method according to claim 11, further comprising the steps of:
   setting said phase difference to a first initial phase difference,
   recording and reproducing a signal with said first phase difference,
   correcting error of said reproduced signal,
   detecting a first error rate when said error is corrected,
   setting said phase difference to a second initial phase difference differing from said first initial phase difference by said predetermined amount,
   recording and reproducing a signal with said second initial phase difference,
   correcting error of said reproduced signal,
   detecting a second error rate when said error is corrected, and
   shifting said first initial phase difference by half a cycle of said laser drive signal when said first error rate is lower than said second error rate.

* * * * *